(12) United States Patent
Fry (10) Patent No.: US 7,409,427 B2
(45) Date of Patent: Aug. 5, 2008

(54) SYSTEMS AND METHODS FOR LIGHTWEIGHT CONVERSATIONS

(75) Inventor: Chris Fry, Berkekley, CA (US)

(73) Assignee: BEA Systems, Inc., San Jose, CA (US)

( * ) Notice: Subject to any disclaimer, the term of this patent is extended or adjusted under 35 U.S.C. 154(b) by 96 days.

(21) Appl. No.: 10/733,599

(22) Filed: Dec. 11, 2003

(65) Prior Publication Data

US 2004/0205139 A1 Oct. 14, 2004

Related U.S. Application Data (60) Provisional application No. 60/450,139, filed on Feb. 25, 2003.

(51) Int. Cl.
*G06F 15/16* (2006.01)
(52) U.S. Cl. ............ 709/206; 709/204
(58) Field of Classification Search ............ 709/204, 709/223, 206, 203, 205; 345/758; 379/93.01
See application file for complete search history.

(56) References Cited

U.S. PATENT DOCUMENTS

| | | | | |
|---|---|---|---|---|
| 6,212,548 | B1 * | 4/2001 | DeSimone et al. | 709/204 |
| 6,401,111 | B1 * | 6/2002 | Dan et al. | 709/204 |
| 6,442,713 | B1 | 8/2002 | Block et al. | 714/43 |
| 2001/0037367 | A1 * | 11/2001 | Iyer | 709/204 |
| 2002/0188666 | A1 * | 12/2002 | Lemon et al. | 709/203 |
| 2003/0009525 | A1 * | 1/2003 | Yasue | 709/205 |
| 2003/0037110 | A1 * | 2/2003 | Yamamoto | 709/204 |
| 2003/0131050 | A1 * | 7/2003 | Vincent | 709/203 |
| 2004/0015548 | A1 * | 1/2004 | Lee | 709/204 |
| 2004/0034687 | A1 * | 2/2004 | Friedman | 709/205 |
| 2004/0078435 | A1 * | 4/2004 | Dunbar et al. | 709/206 |
| 2004/0078455 | A1 * | 4/2004 | Eide et al. | 709/223 |
| 2004/0136511 | A1 * | 7/2004 | Schwartz et al. | 379/93.01 |
| 2004/0145608 | A1 * | 7/2004 | Fay et al. | 345/758 |
| 2004/0158610 | A1 * | 8/2004 | Davis et al. | 709/206 |

FOREIGN PATENT DOCUMENTS

WO PCT/US04/05259 2/2005

OTHER PUBLICATIONS

Budzik et al, "Clustering for Opportunistic Communication", Dept. of Computer Science, Northwestern University, Jul. 16, 200.*

* cited by examiner

*Primary Examiner*—Jungwon Chang
(74) *Attorney, Agent, or Firm*—Fliesler Meyer LLP

(57) ABSTRACT

Transaction management systems can take advantage of a lightweight approach to conversation management. In a cluster, a conversation manager can be used to keep track of state location throughout the cluster. When a cluster computing device receives a request, that computing device can contact the conversation manager to determine the location of the state within the cluster. Once the conversation manager provides the computing device with the location of the state, the computing device can invoke the state for the conversation. All state information can be kept in-memory on computing devices in the cluster in order to improve performance.

This description is not intended to be a complete description of, or limit the scope of, the invention. Other features, aspects, and objects of the invention can be obtained from a review of the specification, the figures, and the claims.

47 Claims, 5 Drawing Sheets

```
public interface ConversationManager {
    public boolean registerConversation(String conversationId);
    public WebServiceConversation getConversation(String conversationId);
    public String leaseConversation(String conversationId, String machineID);
    public void endConversation(String conversationId);
    public void setLeaseTime(long leaseTime);
    public int getLeaseTime();
} public interface WebServiceConversation {
    {
    public long getCreationTime();
    public java.lang.String getId();
    public long getLastAccessedTime();
    public void setMaxInactiveInterval(int);
    public int getMaxInactiveInterval();
    public java.lang.Object getAttribute(java.lang.String);
    public java.util.Enumeration getAttributeNames();
    public void setAttribute(java.lang.String, java.lang.Object);
    public void invalidate();
    public boolean isNew();
}
```

*Figure 5*

SYSTEMS AND METHODS FOR LIGHTWEIGHT CONVERSATIONS

CLAIM OF PRIORITY

This application claims priority from the following application, which is hereby incorporated by reference in its entirety:

U.S. Provisional Application No. 60/450,139, entitled SYSTEMS AND METHODS FOR LIGHTWEIGHT CONVERSATIONS, by Chris Fry, filed on Feb. 25, 2003.

CROSS-REFERENCED CASES

The following application is cross-referenced and incorporated herein by reference:

U.S. patent application Ser. No. 09/785,693, entitled CONVERSATION MANAGEMENT SYSTEM FOR ENTERPRISE WIDE ELECTRONIC COLLABORATION, by Rocky Stewart et al., filed Feb. 16, 2001.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to the management of conversations in a cluster, such as for Web services.

BACKGROUND

Within the context of a business application, the collective set of well-defined and ordered messages exchanged between participants can be referred to as a "conversation". To manage these unique conversations, a typical approach utilizes a collaborative system that provides the capability to handle the conversation states, which may include, but are not limited to, programs, applications, services, database instances, etc. As conversations are initiated, executed, and completed, a conversation manager can track and manage them, ensuring that the conversations are completed, and orchestrating the overall process execution. Some of these collaborate systems maintain conversation state information in a database. Each time a request comes into a conversation space, the conversation manager must access a database containing the state information and load it for the particular conversation. This results in a resource-costly hit to a database each time a message is received in the conversation space.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Systems and methods in accordance with one embodiment of the present invention overcome deficiencies in existing transaction management systems by taking advantage of a lightweight approach to conversation management. Such a lightweight approach can provide a significant increase in performance, which can be desirable when implementing and utilizing Web services, for example. A conversation can be setup between two processes, or conversation partners, each residing on a separate computing device that is capable of communicating through, by way of a non-limiting example, at least one public (e.g., internet) or private network (e.g., intranet), distributed system, client/server system, shared memory, etc. One of the conversation partners might reside on a computing device in a computing device cluster, which might include a number of such devices. The computing device can be, but is not limited to, a mainframe computer, desktop or laptop PC, workstation, PDA, cell phone, electronic messaging device etc. on either the client or the server side of an application. When a message for a conversation comes into that computing device cluster, an identifier (ID), which, by way of a non-limiting example, can be a string of letters and digits, will be included with that message. When this message comes into one of the computing devices in the cluster, it is necessary to determine whether the cluster is maintaining the state correlated with that ID. If the cluster is maintaining such state, it is necessary to determine the location of the state.

Figure 1:
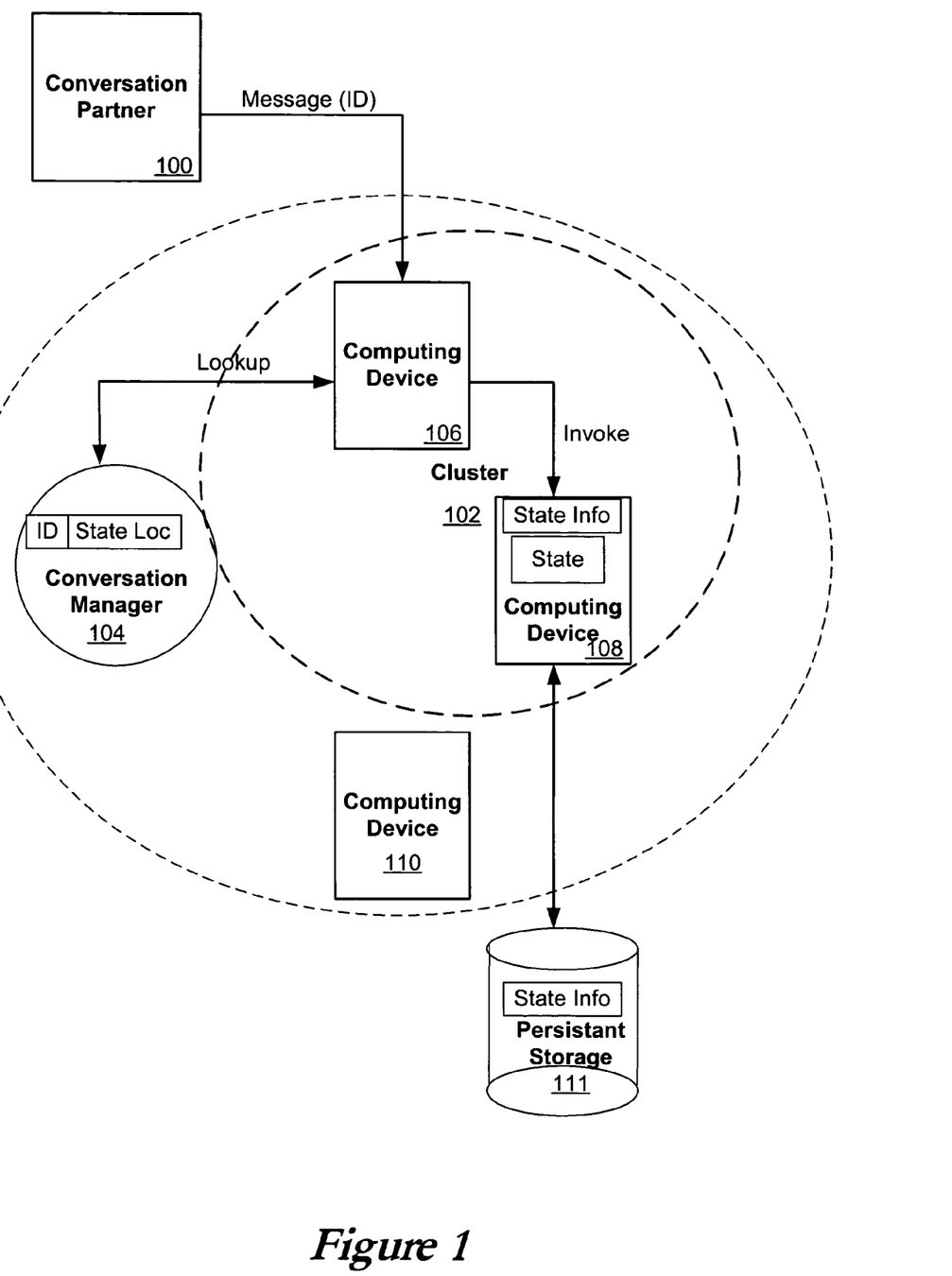
FIG. 1 is a diagram showing a conversation system that can be used in accordance with one embodiment of the present invention.
Figure 5:
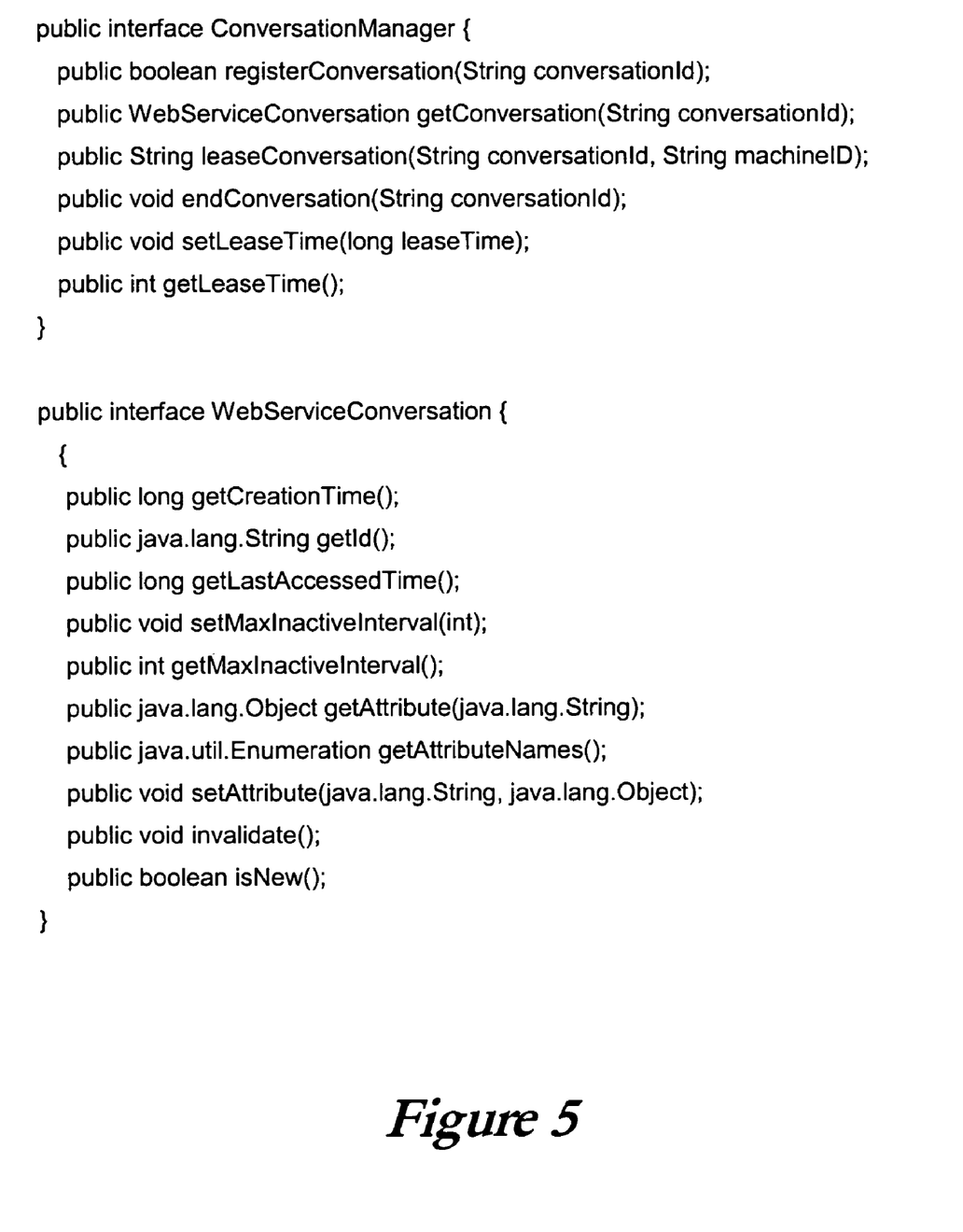
FIG. 5 is a code example for an API that can be used with the system of FIG. 1 in an embodiment.

In a cluster, there can be a conversation manager that keeps track of state location throughout the cluster. The conversation manager can be, for example, a management object or a management service. When a computing device receives a request, that computing device can contact the conversation manager to determine the location of the state within the cluster. An example of this is shown in FIG. 1. In one embodiment, a conversation partner 100 sends a message on the conversation that is received by a computing device 106 in the cluster 102. That computing device 106 can contact the conversation manager 104 to determine the location of the state for the message containing a particular conversation ID. The conversation manager can inform computing device 106 that the state for that conversation ID is located on computing device 108. Computing device 106 can then route to that device, or directly invoke the state from computing device 108. In one embodiment and by way of non-limiting examples, state can be invoked over a Java Remote Method Invocation (RMI), a Common Object Request Broker Architecture (CORBA), or any other application service. Approaches for utilizing these types of services are well known to those of ordinary skill in the art. An exemplary API that can be used with the system of FIG. 1 is shown in FIG. 5.

In one embodiment, each computing device in a cluster can maintain an internal map of every state leased (i.e., access licensed to a client for a certain period of time), owned, or stored on it. Such state information can be stored in-memory on computing devices in the cluster. This gives the conversation management its "lightweight" characteristics. Since all state information is stored in-memory, there is no need to do a resource-intensive database lookup for each message received. This can provide a significant increase in performance. The increase in performance can be balanced with the need for reliability, as keeping everything in-memory can decrease reliability as a cluster failure can cause all state information to be lost.

In one embodiment, if a computing device receives a request for which that computing device owns the appropriate state, the computing device can simply answer the request directly without contacting the conversation manager. This in and of itself can be a substantial performance enhancement over existing systems. If the computing device has to do a "lookup" by contacting the conversation manager, the computing device can use the location information to do an RMI lookup instead of a Web service lookup, which can also provide a performance benefit.

Certain embodiments can allow a user to determine the balance between reliability and performance. For example, reliability can be improved by storing at least some state information to persistent storage, which may include, but is not limited to, database, hard drive, and other mass storage device. These embodiments can improve reliability, but may decrease performance and increase the number of conditions to be satisfied and monitored throughout the cluster.

If a computing device in a conversation cluster becomes unavailable, the conversation manager may not have any indication that the computing device is not available. The conversation manager can still inform a computing device receiving the request of the location stored by the conversation, and it is only when the receiving computing device attempts to invoke a state on that failed computing device that the receiving computing device learns that the failed computing device is unavailable. In certain embodiments, it is possible for a conversation manager to periodically check for the availability of cluster computing devices, such as by periodically pinging them.

A conversation manager can be useful in situations where at least two clients are sharing the same conversational state. In one embodiment, a centralized conversation manager can create new conversations and controls access to conversations. The session state of a Web service conversation can offer primary and secondary replication with primaries and secondaries being distributed across the cluster. A conversation manager can be capable of replication, and capable of recovering from failure. Further, when a primary computing device fails, the conversation manager can be capable of routing to the secondary computing device, such that the secondary computing device becomes the new primary and a new secondary is created.

In one embodiment, a conversation manager can control the location and leasing of a conversational state within a cluster. The conversation manager can consist of a hash table lookup of conversation IDs to states' locations. The conversation manager can grant leases to the various states. If a state has a lease on the conversation, it can freely handle any incoming invoke requests. If an invoking request is received and the lease for a state has expired, the state can attempt to gain a new lease, or lease extension, from the conversation manager. If the lease is already granted to another computing device, the request can be redirected to the new location of the state, and the current instance can be destroyed.

Conversations may or may not be available to maintain shared state. If conversations can share state, multiple Web services can be joined using the shared state during their sessions. If conversations cannot share state, a conversation manager can be used to maintain the state information in a central location, and information about the completion of the participants can be coordinated the same place where the Web service is offered, and to which requests are sent for executing it. A conversation manager can be used to track participating Web services that register to join a state, and managers themselves can become participants that represent other Web services.

Figure 2:
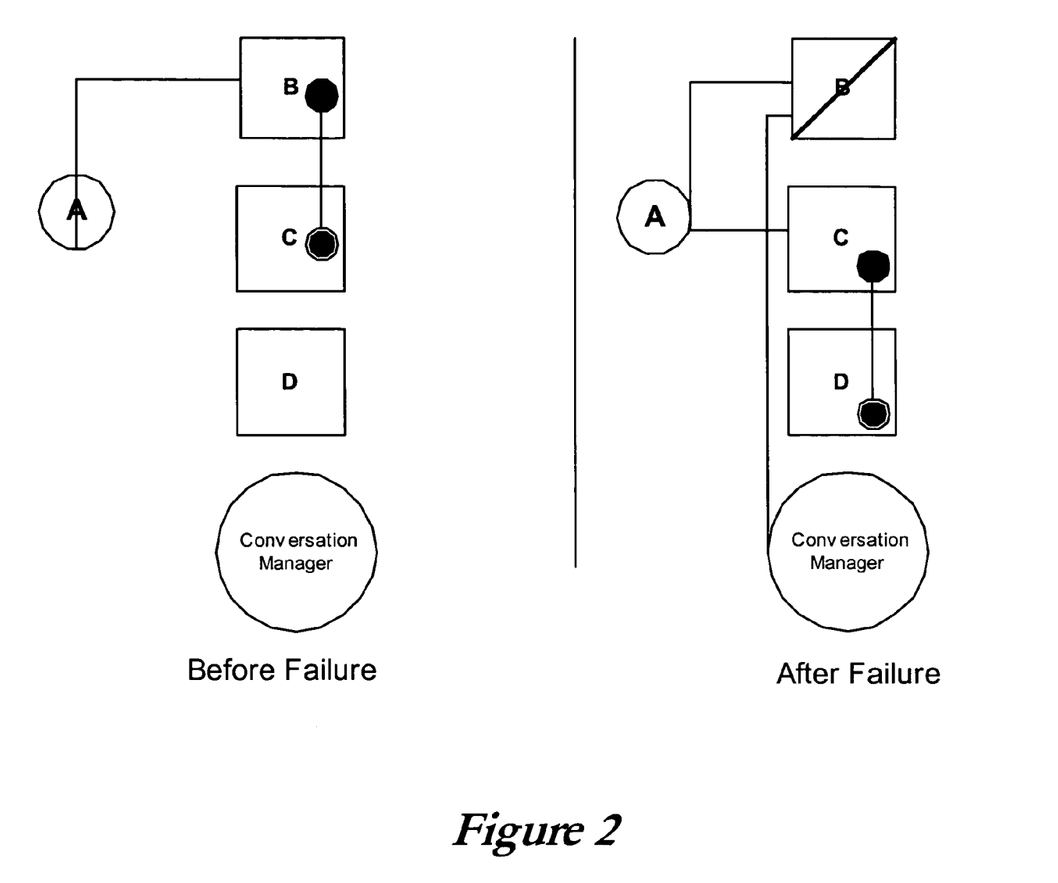
FIG. 2 is a diagram showing a failure scenario for the system of FIG. 1 in an embodiment.
Figure 3:
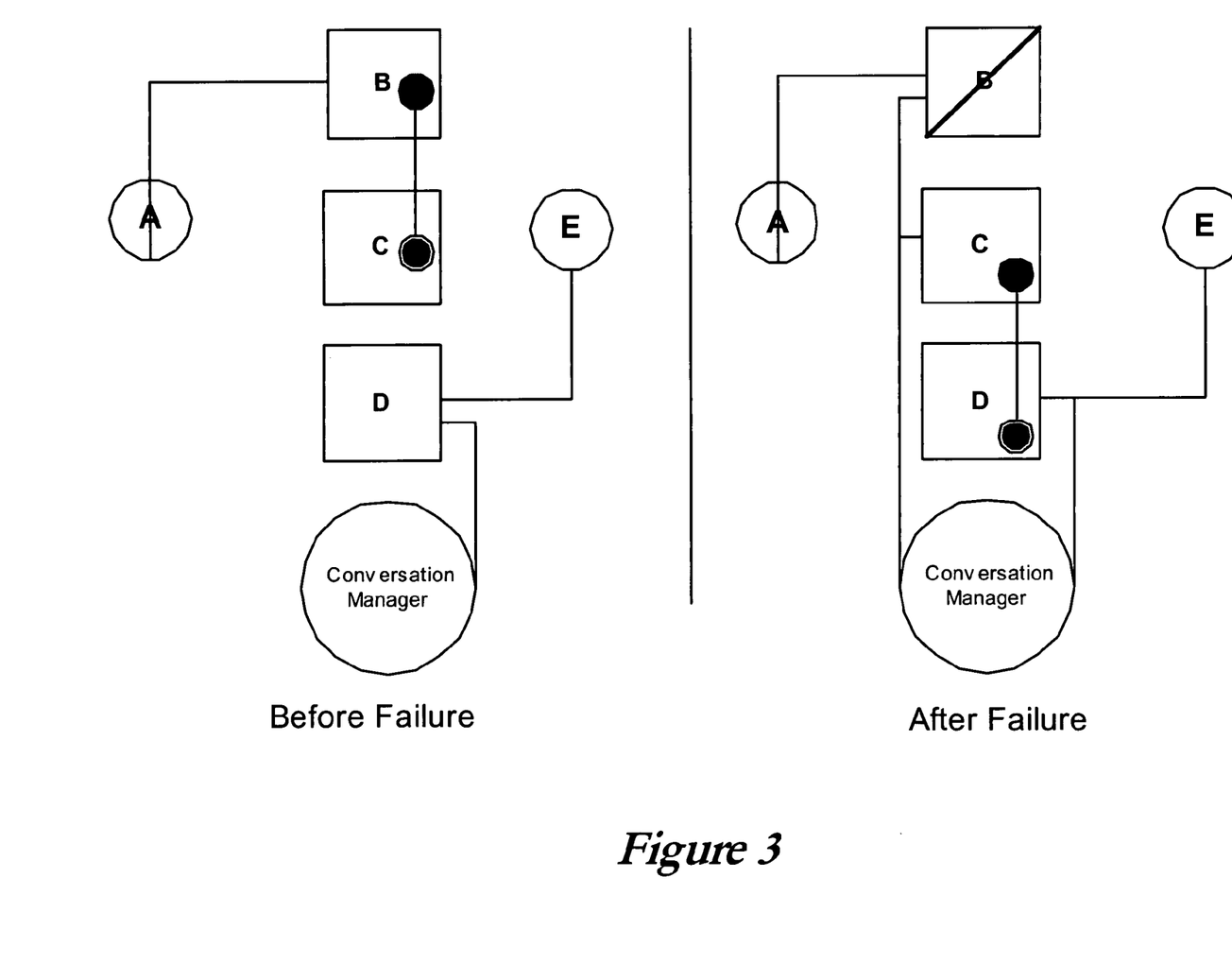
FIG. 3 is a diagram showing another failure scenario for the system of FIG. 1 in an embodiment.
Figure 4:
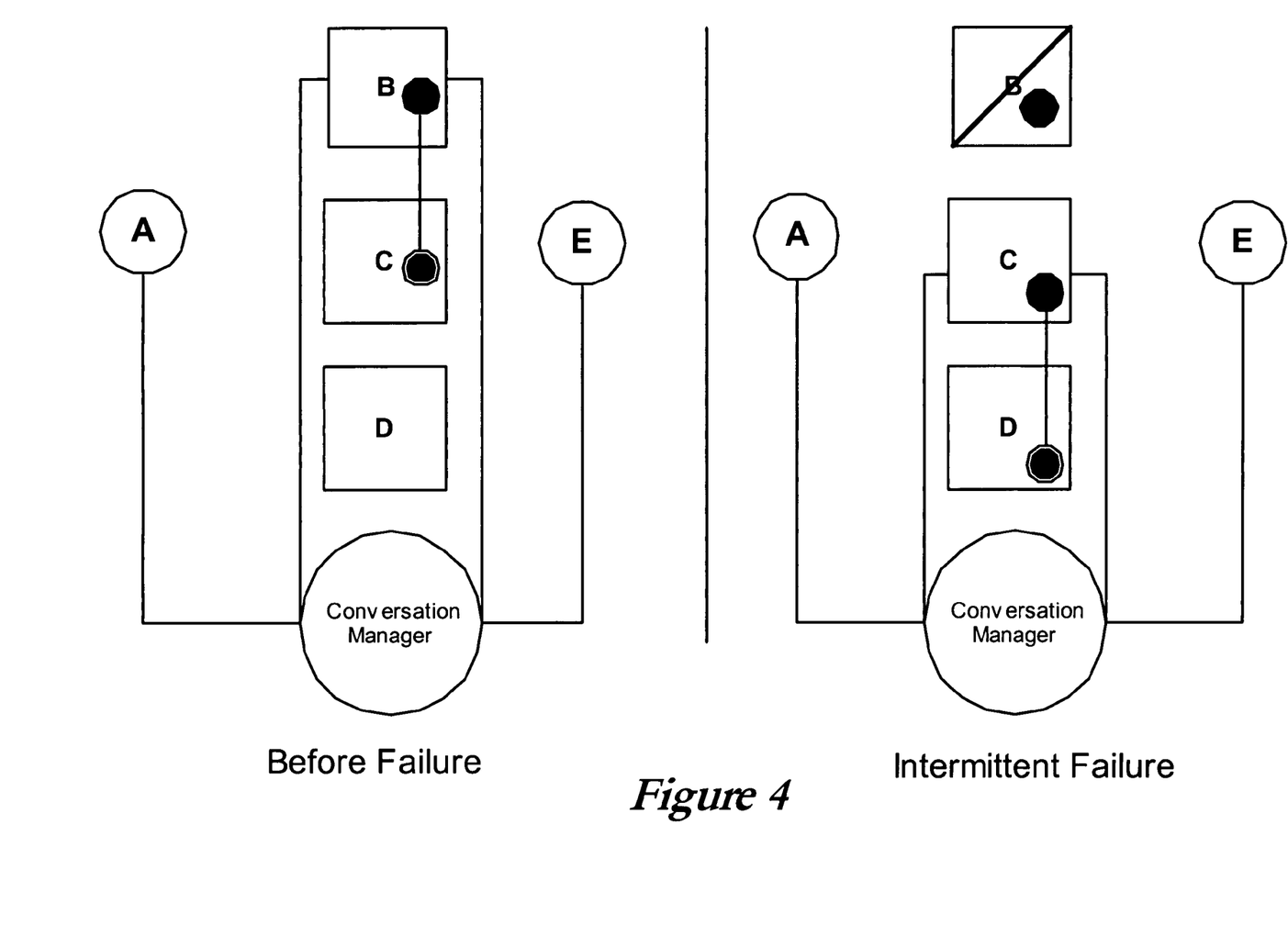
FIG. 4 is a diagram showing yet another failure scenario for the system of FIG. 1 in an embodiment.

In one exemplary failure scenario, a primary can fail without a subordinate conversation. In this case, as shown in FIG. 2, the primary (B) fails, the conversation manager routes client A to the secondary (C), which becomes the new primary and (D) becomes the new secondary. In a second failure scenario where the primary (B) fails with subordinate conversation, as shown in FIG. 3, clients A & E are both routed to the new primary (C). In a third failure scenario where the primary (B) freezes, as shown in FIG. 4, primary (B) intermittently fails. The conversation manager routes client E to the new primary (C) and cleans up the old primary.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide conversation states, comprising:
a first computing device capable of:
running a process on the first computing device; and accepting a message during a conversation between the process running on the first computing device in a cluster and another process that is running on a computing device outside the cluster, wherein the message is associated with a conversation state that operates to be invoked over an application service wherein the application service is a Java Remote Method Invocation (RMI) or a Common Object Request Broker Architecture (CORBA);
a second computing device in the cluster capable of:
    maintaining the conversation state requested by the message; and
    storing information of the conversation state in memory on the second computing device; and
a conversation manager capable of:
    identifying the location of the second computing device which maintains the conversation state requested by the message; and
    providing the location and/or the information of the conversation state to the first computing device.

2. The system according to claim 1, wherein:
the first and second computing devices form a cluster.

3. The system according to claim 1, wherein:
the conversation manager is capable of maintaining the locations of all conversation states in the system.

4. The system according to claim 1, wherein:
the information may include, a map of every conversation state leased, owned, or stored on the second computing device.

5. The system according to claim 1, wherein:
the first and second computing devices are the same computing device.

6. The system according to claim 1, wherein:
the second computing device is capable of maintaining the information both in-memory and on persistent storage.

7. The system according to claim 1, wherein:
the conversation manager is capable of designating the second computing device as the primary and replicating the information on the second computing device to a third computing device.

8. The system according to claim 7, wherein:
the conversation manager is capable of routing to the third computing device and setting it as the new primary when the second computing device fails.

9. The system according to claim 1, wherein:
the conversation manager is capable of periodically determining the availability of the second and third computing devices.

10. The system according to claim 1, wherein:
the conversation can be within the context of a business application.

11. The system according to claim 1, wherein:
the conversation state can be one of: a program, an application, a service, and a database instance.

12. A system to provide conversation for Web service, comprising:
a conversation partner, which is a process, capable of providing a message during a conversation between the conversation partner and a process running on a first computing device;
said first computing device capable of accepting a message during the conversation with the conversation partner, wherein the message is associated with a conversation state that operates to be invoked over an application service wherein the application service is a Java Remote Method Invocation (RMI) or a Common Object Request Broker Architecture (CORBA);
a second computing device capable of:
    maintaining the conversation state requested by the message; and
    storing information of the conversation state in memory on the second computing device; and
a conversation manager capable of:
    identifying the location of the second computing device which maintains the conversation state requested by the message; and
    providing the location and/or the information of the conversation state to the first computing device.

13. The system according to claim 12, wherein:
the message includes a conversation ID.

14. The system according to claim 13, wherein:
the first computing device is capable of contacting the conversation manager to determine the location of the conversation state requested by the message using the conversation ID.

15. The system according to claim 13, wherein:
the conversation manager is capable of providing the location and/or the information of the conversation state to the first computing device requesting it based on the conversation ID.

16. The system according to claim 12, wherein:
the first computing device is capable of answering a request for the conversation state directly without contacting the conversation manager if it owns such state.

17. The system according to claim 12, wherein:
the conversation manager is capable of accepting a request for the location of the conversation state from the first computing device.

18. The system according to claim 12, wherein:
the first computing device is capable of accepting the location of the conversation state from the conversation manager.

19. The system according to claim 12, wherein:
the first computing device is capable of invoking the conversation state on the second computing device in order to respond to the conversation message received.

20. The system according to claim 12, wherein:
the conversation manager is capable of sharing the conversation state with at least two conversations.

21. The system according to claim 12, wherein:
the conversation manager is capable of tracking a participating Web service that initiates the conversation.

22. The system according to claim 21, wherein:
the conversation manager is capable of sharing the conversation state with at least two Web services and joining the sessions of these services.

23. A method to provide a conversation for a Web service, comprising:
maintaining a conversation state on a second computing device in a cluster;
storing information of the conversation state in memory on the second computing device;
accepting a message requesting the conversation state during a conversation between a process running on a first computing device in a cluster and another process that is running on a computing device outside the cluster;
contacting a conversation manager to determine the location of the conversation state requested by the message;
accepting the location and/or the information of the conversation state from the conversation manager; and
invoking the conversation state over an application service wherein the application service is a Java Remote Method Invocation (RMI) or a Common Object Request Broker Architecture (CORBA) on the computing device in order to respond to the conversation message.

24. The method according to claim 23, further comprising: maintaining the locations of all conversation states in the system on the conversation manager.

25. The method according to claim 23, further comprising: maintaining on the computing device its conversation state information, which may include, a map of every state leased, owned, or stored on it.

26. The method according to claim 25, further comprising: maintaining the conversation state information on the computing device both in-memory and on persistent storage.

27. The method according to claim 25, further comprising: designating the computing device as the primary and replicating the conversation state information on the computing device to another computing device.

28. The method according to claim 27, further comprising: routing to the another computing device; and setting it as the new primary when the current primary computing device fails.

29. The method according to claim 23, further comprising: determining the availability of the computing devices periodically.

30. The method according to claim 23, further comprising: accepting request for the location of the conversation state from a computing device; and providing the location of the conversation state to the computing device requesting it.

31. The method according to claim 23, further comprising: sharing the state with at least two conversations.

32. The method according to claim 23, further comprising: tracking a participating Web service that initiates the conversation.

33. The method according to claim 32, further comprising: sharing the conversation state with at least two Web services; and joining the sessions of these services.

34. A method to provide a conversation for a Web service, comprising:
    maintaining a conversation state on a second computing device in a cluster;
    storing information of the conversation state in memory on the second computing device;
    accepting a message requesting the conversation state during a conversation between a process running on a first computing device in a cluster and another process that is running on a computing device outside the cluster; and
    invoking the conversation state over an application service wherein the application service is a Java Remote Method Invocation (RMI) or a Common Object Request Broker Architecture (CORBA) on the computing device in order to respond to the conversation message received directly at the computing device without contacting a conversation manager.

35. A machine readable storage medium having instructions stored thereon that when executed by a processor cause a system to:
    maintain a conversation state on a second computing device in a cluster;
    store the information of the conversation state in memory on the second computing device;
    accept a message requesting the state during a conversation between a process running on a first computing device in a cluster and another process that is running on a computing device outside the cluster;
    contact a conversation manager to determine the location of the conversation state requested by the message;
    accept the location and/or the information of the conversation state from the conversation manager; and
    invoke the conversation state over an application service wherein the application service is a Java Remote Method Invocation (RMI) or a Common Object Request Broker Architecture (CORBA) on the computing device in order to respond to the conversation message.

36. The machine readable storage medium of claim 35, further comprising instructions that when executed cause the system to:
    maintain the locations of all conversation states in the system on the conversation manager.

37. The machine readable storage medium of claim 35, further comprising instructions that when executed cause the system to:
    maintain on the computing device information, which may include, a map of every conversation state leased, owned, or stored on it.

38. The machine readable storage medium of claim 37, further comprising instructions that when executed cause the system to:
    maintain the conversation state information on the computing device both in-memory and on persistent storage.

39. The machine readable storage medium of claim 38, further comprising instructions that when executed cause the system to:
    designating the computing device as the primary and replicating the conversation state information on the computing device to another computing device.

40. The machine readable storage medium of claim 39, further comprising instructions that when executed cause the system to:
    route to the another computing device; and
    set it as the new primary when the current primary computing device fails.

41. The machine readable storage medium of claim 35, further comprising instructions that when executed cause the system to:
    check for the availability of the computing devices periodically.

42. The machine readable storage medium of claim 35, further comprising instructions that when executed cause the system to:
    accept request for the location of the state from a computing device; and
    provide the location of the state to the computing device requesting it.

43. The machine readable storage medium of claim 35, further comprising instructions that when executed cause the system to:
    share the state with at least two conversations.

44. The machine readable storage medium of claim 35, further comprising instructions that when executed cause the system to:
    track a participating Web service that initiates the conversation.

45. The machine readable storage medium of claim 44, further comprising instructions that when executed cause the system to:
    share the conversation state with at least two Web services; and
    join the sessions of these services.

46. A machine readable storage medium having instructions stored thereon that when executed by a processor cause a system to:
    maintain a conversation state on a second computing device in a cluster;

store information of the conversation state in memory on the second computing device;

accept a message requesting the conversation state during a conversation between a process running on a first computing device in a cluster and another process that is running on a computing device outside the cluster; and invoke the conversation state over an application service wherein the application service is a Java Remote Method Invocation (RMI) or a Common Object Request Broker Architecture (CORBA) on the computing device in order to respond to the conversation message received directly at the computing device without contacting a conversation manager.

47. A system for handling conversation, comprising:

means for maintaining a conversation state on a second computing device in a cluster;

means for storing information of the conversation state in memory on second the computing device;

means for accepting a message requesting the conversation state during a conversation between a process running on a first computing device in a cluster and another process that is running on a computing device outside the cluster;

means for contacting a conversation manager to determine the location of the conversation state requested by the message;

means for accepting the location and/or the information of the conversation state from the conversation manager; and means for invoking the conversation state over an application service wherein the application service is a Java Remote Method Invocation (RMI) or a Common Object Request Broker Architecture (CORBA) on the computing device in order to respond to the conversation message.

* * * * *

UNITED STATES PATENT AND TRADEMARK OFFICE
CERTIFICATE OF CORRECTION

| | | |
|---|---|---|
| PATENT NO. | : 7,409,427 B2 | Page 1 of 1 |
| APPLICATION NO. | : 10/733599 | |
| DATED | : August 5, 2008 | |
| INVENTOR(S) | : Fry | |

It is certified that error appears in the above-identified patent and that said Letters Patent is hereby corrected as shown below:

On Title page, in field 75, in column 1, in "Inventors", line 1, delete "Berkekley" and insert -- Berkeley --, therefor.

On Title page, in column 2, in "Other Publications", line 2, delete "200.*" and insert -- 2002 --, therefor.

On sheet 2 of 5, in Figure 2, line 1, delete "Conv ersation" and insert -- Conversation --, therefor.

On sheet 2 of 5, in Figure 2, line 1, delete "Conv ersation" and insert -- Conversation --, therefor.

On sheet 3 of 5, in Figure 3, line 1, delete "Conv ersation" and insert -- Conversation --, therefor.

On sheet 3 of 5, in Figure 3, line 1, delete "Conv ersation" and insert -- Conversation --, therefor.

On sheet 4 of 5, in Figure 4, line 1, delete "Conv ersation" and insert -- Conversation --, therefor.

On sheet 4 of 5, in Figure 4, line 1, delete "Conv ersation" and insert -- Conversation --, therefor.

In column 9, line 18, in Claim 47, delete "second the" and insert -- the second --, therefor.

Signed and Sealed this

Twenty-third Day of March, 2010

David J. Kappos
*Director of the United States Patent and Trademark Office*